United States Patent [19]

Monari

[11] Patent Number: 5,365,375
[45] Date of Patent: Nov. 15, 1994

[54] EXTERNAL OPTICAL DEVICE FOR PROVIDING MULTIPLE OPTICAL PORTS FOR A GUNSIGHT

[75] Inventor: Lawrence M. Monari, Palm Bay, Fla.

[73] Assignee: DBA Systems, Inc., Melbourne, Fla.

[21] Appl. No.: 48,002

[22] Filed: Apr. 19, 1993

[51] Int. Cl.⁵ .................................................. G02B 27/14
[52] U.S. Cl. ................................ 359/629; 359/363; 359/638; 359/643
[58] Field of Search ............... 359/363, 629, 638, 643, 359/399

[56] References Cited

U.S. PATENT DOCUMENTS

| | | | |
|---|---|---|---|
| 1,470,770 | 10/1923 | Siedentopf | 359/363 |
| 3,008,396 | 11/1961 | Mito | 359/363 |
| 4,732,438 | 3/1988 | Orbach et al. | 358/108 X |
| 4,993,819 | 2/1991 | Moorhouse | 434/20 X |

FOREIGN PATENT DOCUMENTS 59-33419  2/1984  Japan ............... 359/643

*Primary Examiner*—Eugene R. LaRoche
*Assistant Examiner*—F. Niranjan
*Attorney, Agent, or Firm*—Pollock, Vande Sande & Priddy

[57] ABSTRACT

A device for providing multiple optical ports on an optical gunsight with a minimum impact on eye relief and which preserves full viewing angle is provided. A housing which includes first and second hinged housing portions is clamped about the circumference of the gunsight. A lens assembly is supported by one of the housing portions having an optical axis in line with the gunsight optical axis. A front lens and aspheric optical distortion lens relay a gunsight image to the beamsplitter. The beamsplitter directs first and second images from a gunsight image along axes which are in line an perpendicular to the gunsight axes. The assembly also includes identical third and fourth lenses which produce images of the gunsight exit pupil along each of these axes.

8 Claims, 3 Drawing Sheets

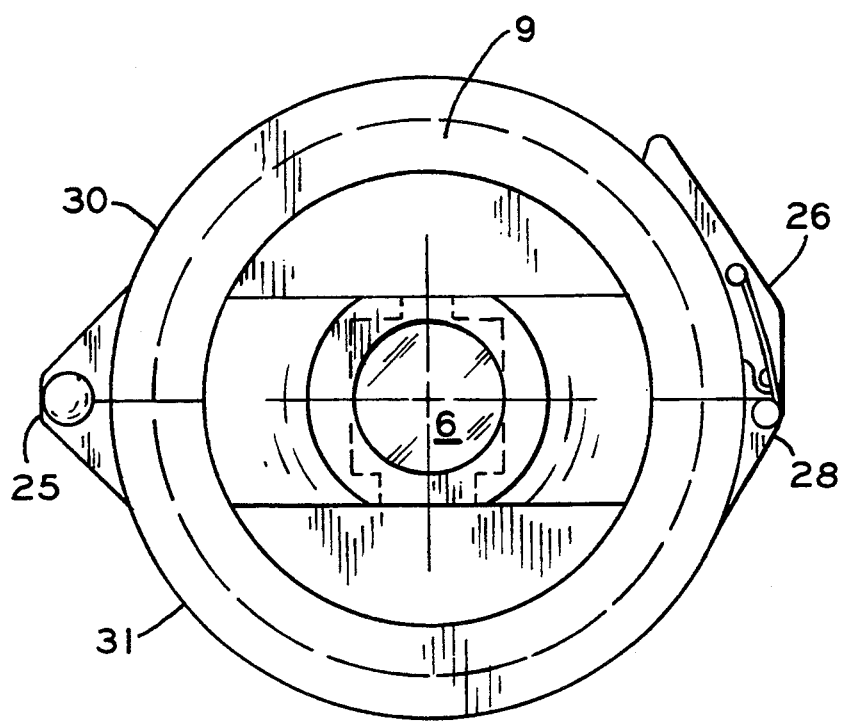
FIG_1B

EXTERNAL OPTICAL DEVICE FOR PROVIDING MULTIPLE OPTICAL PORTS FOR A GUNSIGHT

The present invention relates to optical gunsight viewing devices. Specifically, an attachment is provided for coupling to an optical gunsight, permitting multiple port viewing of an input scene to the gunsight.

Modern infantry weapons, particularly those used in armored vehicles, provide for an optical gunsight for pointing the weapon at the target. Normally, the vehicles have limited head room and can accommodate only one gunner at a time, who views the target area through a single optical eyepiece. Space is at such a premium that there is limited room available to permit attachment of any device which would either record a scene viewed through the gunsight or permit simultaneous viewing by more than one person through the gunsight. It is also necessary to keep the eye relief as long as possible so as to maintain a safe 15 mm minimum distance between the sight and the gunner's eye during operation. It is also necessary to keep the magnification the same as the gunsight.

A device which is capable of being coupled to the optical gunsight and provides additional optical ports for either viewing a target scene or projecting an image over the target scene, is described more particularly in U.S. Pat. No. 4,993,819 as well as in U.S. Pat. No. 4,732,438. In Patent the device, of U.S. Pat. No. 4,993,819 a viewing apparatus is provided which, when coupled to the gunsight, will fold the image a number of times and split the image for viewing through first and second optical ports. The design employed in this prior art patent requires a certain number of folds of the optical image to be certain the image obtained maintains the same top, bottom, left, right orientation.

Although the device described in the aforesaid patent is usable in most applications, wherein minimum eye relief is provided, it would still be advantageous to reduce the amount of room required, and specifically to reduce the optical folds necessary to obtain the correctly oriented image on multiple ports.

In order to be effective, the additional image ports must maintain the approximately 60° field of view which is observed through the gunsight, and should not be subject to any obstruction by the attachment of the device. The devices of the prior art appear to be limited to 50% of the original field of view, and suffer optical degradation. In order to not interfere with the appropriate training of users of the artillery piece, the same basic eye position should be maintained to avoid any repositioning of the head from a training exercise to actual combat conditions.

SUMMARY OF THE INVENTION

It is an object of this invention to provide an optical device for expanding the number of optical ports on a gunsight.

It is a specific object of this invention to provide an optical device which provides multiple optical ports on a gunsight which have the same field of view as the single originating optical port of the gunsight.

It is yet another object of this invention to provide for an optical device which provides multiple optical ports on a gunsight which substantially maintains the eye relief of the gunsight and the gunsight magnification.

These and other objects of the invention are provided for by an apparatus which is connected directly to an optical gunsight. A housing having a clamp member is rigidly clamped to the optical gunsight eyepiece. The housing includes an assembly of optical elements having an optical input axis aligned with the axis of the optical gunsight eyepiece.

The function of the optics assembly is to form an exit pupil at the eye, and form a second exit pupil at the camera.

The assembly of optical elements includes a front lens positioned adjacent the gunsight eye lens having a smaller aperture than the optical gunsight aperture. An aspheric lens element is positioned on the opposite side of the front lens. A beamsplitter is located adjacent the aspheric lens, having a first optical axis coincident with the axis of the gunsight eyepiece and a first viewing port. A second optical axis is provided having an axis perpendicular to the first optical axis and coincident with a second optical port. A third lens is located between the beamsplitter and the observer's eye. A fourth lens is located between the beamsplitter and the camera.

In accordance with the preferred embodiment of the invention, the optical device housing comprises two sections which are hinged together in a clamshell configuration. The two housing halves are clamped around the gunsight by an over center latch and latch member attached to respective halves of the housing aligning the optical device input optical axis with the gunsight optical axis. The device utilizes an optical assembly which has a narrow profile, increasing eye distance by only 18 mm from its original position at the exit pupil of the gunsight eyepiece.

The full field of view of the gunsight is maintained at the two viewing optical ports of the device. The in-line optical port is positioned so that a gunner may observe the scene presented by the gunsight. The second viewing optical port is coupled to a video camera, permitting the scene to be recorded or observed on a monitor. The second viewing port is also bidirectional, permitting a scene to be superimposed on the gunsight image.

DESCRIPTION OF THE FIGURES

FIG. 1B is a plan view of the optical device of FIG. 1A.

DESCRIPTION OF THE PREFERRED EMBODIMENT

Figure 1A:
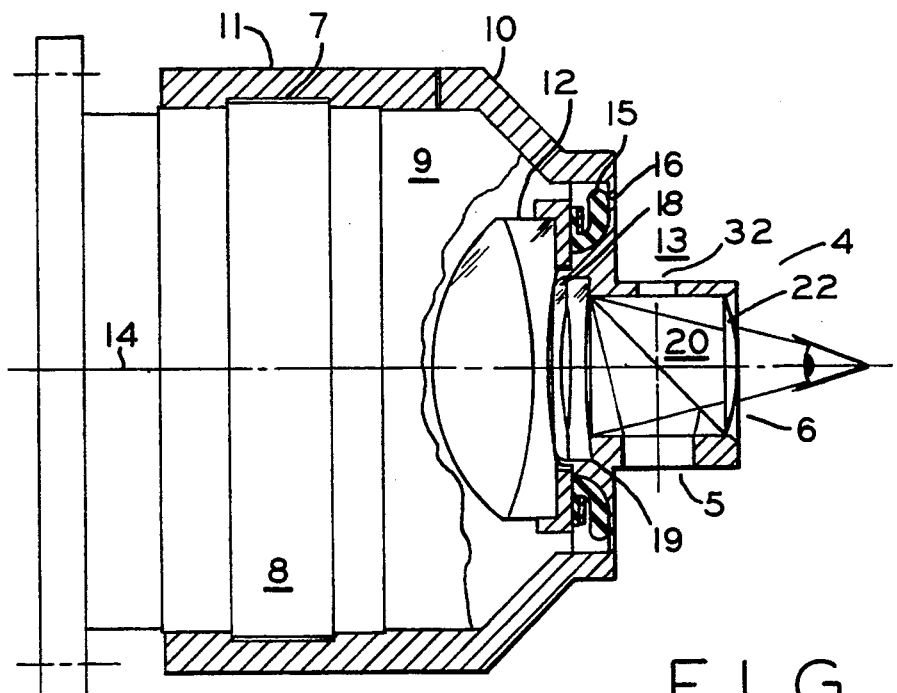
FIG. 1A is a section view of a gunsight equipped with an optical device in accordance with a preferred embodiment of the invention.

Referring now to FIG. 1, there is shown a section view of an optical device in accordance with the preferred embodiment. The optical device is mounted on a gunsight 9 via a forward clamping section 11. The forward clamping section 11 represents an extension of the housing 10, which supports the optical assembly.

The optical assembly presents two ports 5 and 6 for permitting full field of view viewing of the target scene area produced from the optical gunsight 9. The first port 6 is in line with the optical axis, and is viewed by a gunner or commander during training while the other port 5 is coupled to a video camera device (not shown).

The optical port 5 has a viewing axis perpendicular to the gunsight axis 14 and by virtue of the design of the optical assembly, produces a full field of view image for recording.

The device is bi-directional in that a scene may be projected through a third optical port 4 which will be superimposed over the target image received along the optical gunsight axis 14. The image produced from ports 5 and 6 will contain the superimposed image as well. Advantages from superimposing such images can be readily determined from the aforesaid U.S. patent of the prior art, U.S. Pat. No. 4,993,819.

The housing 10 is comprised of two halves, 30 and 31, as can be seen from FIG. 1B, connected via a hinge 25. The two halves 30 and 31 comprise a clamshell assembly which is maintained in position by an over center latch 26 and its cooperating latching member 28. Thus, the entire device may be supported about the optical gunsight 9 without modification to the gunsight.

The housing halves 30, 31 are configured to have a channel 7 for receiving the ocular control 8 on the gunsight. The channel 7 will support the device rigid with respect to the gunsight when the over center latch 26 is in place.

Figure 2:
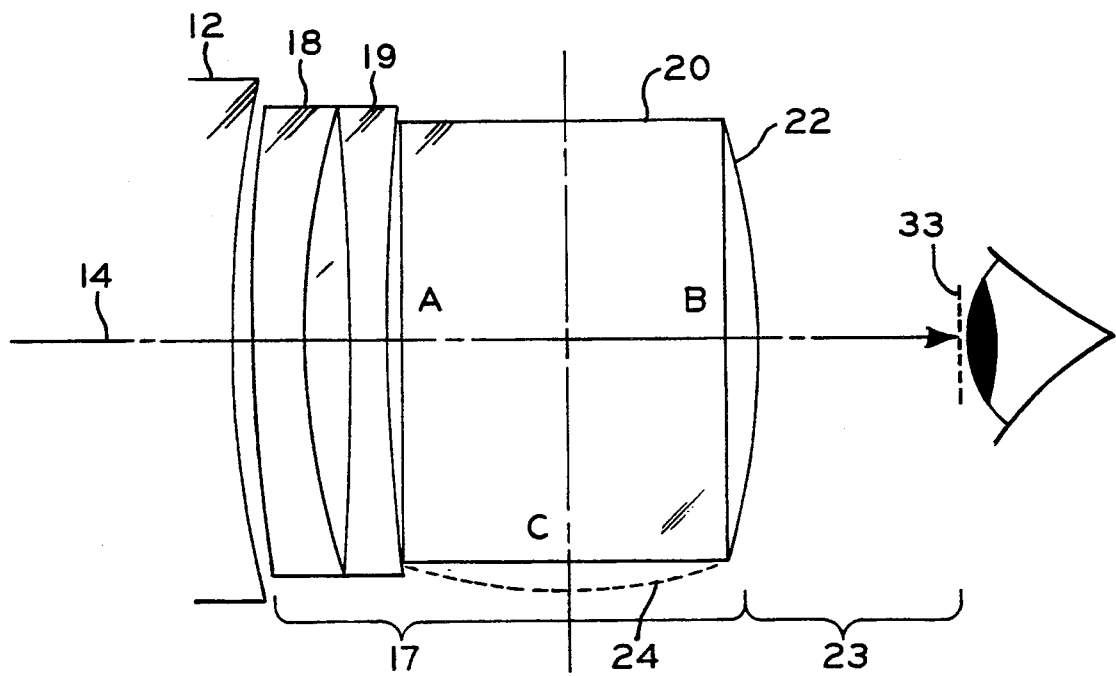
FIG. 2 is an illustration of the optical elements of the preferred embodiment of FIG. 1A with respect to the optical gunsight axis.

One of the housing halves 30, 31 includes a lens assembly 17 which is shown more particularly in FIG. 2. The one housing half has a rearward portion 13 which supports the lens assembly oriented with the eyepiece 12 along the optical axis 14. The first element is a lens 18 which faces the gunsight eyepiece 12. The gunsight eyecup 15, which is made of a flexible material, is compressed by a shoulder 16 on the housing portion 13 so that the lens 18 is positioned along optical axis 14 at a predetermined spacing with respect to the eyepiece 12.

A second aspheric lens 19 faces lens 18. A beamsplitter 20 is positioned adjacent the aspheric lens 19. An eye lens 22 provides the last optical surface for the device. The eye relief is 15 mm. The exit pupil 33 is formed 15 mm from the last surface of eye lens 22.

All optical surfaces were either spherical or flat, with the exception of lens 19, in order to present full field of view viewing through either optical port 5 or 6, and at the same time maximize the eye relief 23, i.e., distance from the surface of lens 22 to the position of viewing, and at the same time, maintain the size of the exit pupil diameter the same as the gunsight to keep the magnification the same as the gunsight. Lens 19 is an aspheric lens rotationally symmetric around the optical axis 14. In the preferred embodiment, it has a base radius at infinity on its first surface, and a base radius of 11.379 inches and 4th order aspheric coefficient of 0.2 on its second surface. This aspheric surface is necessary to control the exit pupil kidney bean effect, such as to keep the kidney bean the same as is observed through the gunsight eyepiece 12, and also to control the amount of eye relief 23.

The aspheric lens 19 may be made of a plastic, acrylic or polycarbonate. Plastic lenses can be molded in large quantities, reducing the overall manufacturing cost of the device. Because of the large field of view, i.e., 60° or better, there are many optical aberrations which must be corrected in order to reproduce a quality image through the ports 5 and 6. The aspheric lens 19 prescription of Table I will provide for the corrections.

The beamsplitter 20 was selected from a material known as CLEARTRAN or equivalent. The CLEARTRAN has a high index of refraction in visible light, which is needed to keep the physical length of the beamsplitter short, and keep the eye relief long.

The eye relief of the gunsight eyepiece alone is 24 mm. The device of FIG. 1A generates an eye relief of 15 mm and places the observer's eye 15 mm behind the eyepiece eyelens 22. The exit pupil of the system is located at this point. Thus, when the device of FIGS. 1 and 2 is clamped to the eyepiece, the observer's head needs to move only 18 mm further from its normal position.

The element positions and dimensions may be determined from FIG. 2 and with reference to Table I. The first lens 18 of the device is a spherical lens made from glass of an optical type 808406 (SCHOTT LASF 3) or equivalent. The optical surface facing the gunsight eyepiece has a radius of curvature R1 equal to 5.460±0.005 inches. The second optical surface has a spherical radius R2 of 1.800±0.002. The surface accuracy is ground to three-ring spherical with a surface irregularity of 1 fringe. The minimum clear aperture of each of the surfaces is 1.07 inches for the entrance aperture and 0.96 mm for the exit aperture.

The first aspheric surface of lens 19 facing the lens 18 has a concave radius of curvature of R1 of $-11.000\pm0.005$. The second aspheric surface has a radius of curvature defined by the following:

$$X = CS^2/1 + (1 - C^2S^2)^{\frac{1}{2}} + A_4S^4 + A_6S^6 + A_nS^n.$$

The quantity S represents the distance from the optical axis 14 of the lens, C represents the base sphere curvature equal to 0 ($R_{base} = \infty$), and A are the surface deformation coefficients. In the preferred embodiment, A2, A6, AS, etc., equals 0, and A4 equals 0.2. The lens has a minimum clear aperture of 0.96 inch for each of the entrance and exit apertures.

The aspheric lens 19 relays the image to a beamsplitter 20. The beamsplitter 20 is shown more particularly in FIGS. 3A and 3B. The beamsplitter is made of a high index material such as CLEARTRAN, where the index of refraction is expressed as ND=2.36789, NF=2.43177, and NC=2.34367. Other high index glasses such as SCHOTT LASF 35 may also be used. The use of material which has a higher index of refraction permits the long eye relief 23 to be maximized. Each of the outer surfaces is flat and coated with an anti-reflection coat of a single or multiple layer dielectric film.

Figure 3A:
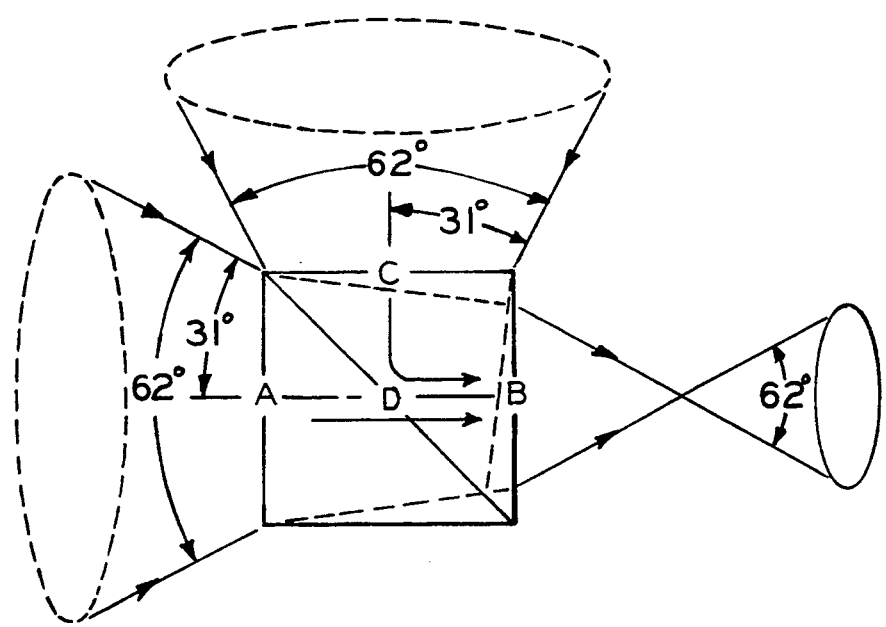
FIG. 3A is an illustration of the beamsplitter element used in the device of FIG. 1.
Figure 3B:
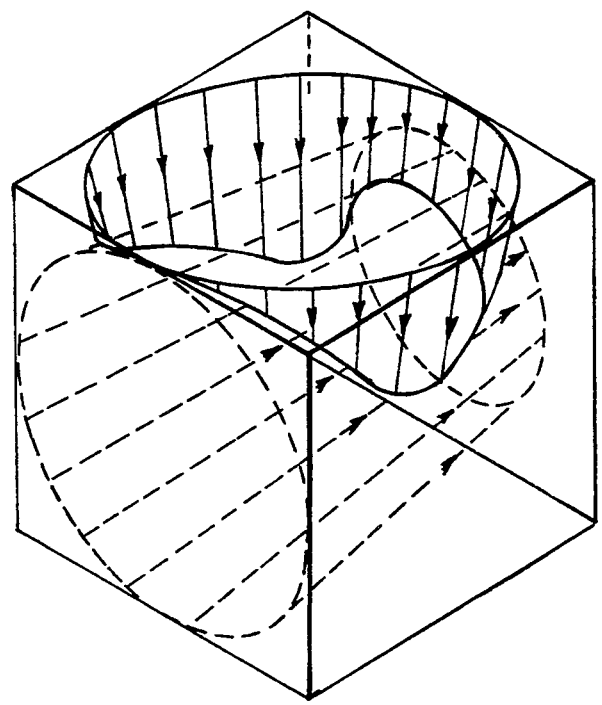
FIG. 3B is an isometric view of the beamsplitter element.

The dotted lines of FIGS. 3A and 3B delimit the clear aperture space for each of surfaces A, B and C. In the preferred embodiment, these surface areas are 0.88, 0.67 and 0.88, minimum. The area occupied by the image beam delineated by the broken and full lines of FIG. 3B is free from bubbles, i.e., $\geq 0.2$ mm diameter. Surface D is a reflective surface having a transmissivity and reflectivity ratio of 50/50. In practice, the outer dimensions of each surface are 0.900+0.005. The surfaces are maintained flat, over each clear aperture, to within $\frac{1}{2}$ a wavelength of 6532.8 nm light waves.

The foregoing assembly of optical elements will provide for the 60° and better optical viewing, through the prism. The prism first and second optical ports, one of which may be coupled to either a camera or projection device, similar to the one disclosed in the aforesaid U.S. Pat. No. 4,993,819.

The lens 22 comprises a glass lens having an optical type of (SCHOTT LASF N30) or equivalent. The front surface thereof is flat, and the second surface has a radius of curvature of $-2.054\pm0.002$. The surface quality is 80/50 and has an accuracy of three-ring spherical.

Surface irregularity is defined as one fringe. An antireflective coating is also added to each of the optical surfaces to reduce the loss of light due to reflections.

As can be seen from FIG. 2, lens 22 is cemented to the flat surface of the beamsplitter 20. The camera lens 24 may also be cemented to the surface of the beamsplitter. The camera lens must be optically compatible with the flat surface presented by the beamsplitter having a configuration directly bondable to the beamsplitter output surface.

With the foregoing structure, it is clear that the objective of having a multiple ported optical device coupled to a gunsight which has a tolerable eye relief and which produces the same field of view as the gunsight can be obtained. The quality of the image is maintained due to the aspherizing of the gunsight image which corrects for various optical distortions in the system.

TABLE I

| Element | Material | Surface$^1$ Curvature$^{R1}$ | Element Thickness | Surface$^2$ Curvature$^{R1}$ | Distance to Adjacent Element |
|---|---|---|---|---|---|
| 18 | LASFN 3 | 5.460 ± .005 convex | 0.050 | 1.800 ± .002 concave | 0.050 |
| 19 | Acrylic | −11.00 ± .005 concave | 0.125 | Aspheric concave | 0.015 |
| 20 | CLEARTRAN ND = 2.36789 NC - 2.34367 | all surfaces flat | 0.0800 | $R_{BASE} = \infty$ $A_4 = 0.2$ | 0.0 |
| 22 | LASFN 30 | flat | 0.150 | −2.054 ± .002 convex | 0.6 inch (15 mm) eye relief |

All measurements are in inches unless otherwise stated.

Thus, there has been described with respect to one embodiment, an optical device for providing multiple optical ports on a gunsight. Those skilled in the art will recognize yet other embodiments of the invention which are described in the claims which follow:

What is claimed is:

1. A device for providing a viewing port to an optical gunsight and a camera optical port for recording gunsight produced images comprising:
   a housing having a first end which is clamped to the end of an optical gunsight, said housing having a second end in line with said first end, forming a viewing port having an axis common with said gunsight axis, and including a camera optical port having an axis perpendicular to the optical gunsight axis;
   an assembly of optical elements located in said housing, said assembly including:
   a front lens positioned adjacent said optical gunsight aperture;
   an aspheric lens adjacent said first lens;
   a beamsplitter located adjacent said aspheric lens having a first exit surface having an axis coincident with the axis of said first lens, said aspheric lens, and said housing second end, and a second exit surface having an axis perpendicular to the axis of said first lens and coincident with the axis of said camera optical port; and,
   an eye lens having flat surface bonded to said beamsplitter first exit surface.

2. The device of claim 1 further including a hinge supporting first and second portions of said housing about the circumference of said gunsight into alignment with said gunsight optical axis and means for maintaining said housing in said alignment.

3. The device of claim 2 wherein one of said housing portions includes an over center clamp which cooperates with a clamping member on said remaining housing portion.

4. A device for providing multiple optical ports on an optical gunsight comprising:
   a housing providing multiple optical ports on an optical gunsight, said housing comprising:
   first and second housing portions hinged together at one end, said housing portions enclosing a viewing end of said optical gunsight, and including clamping means for maintaining said housing portions clamped to said gunsight; and,
   an optical assembly supported by one of said housing portions, having an input optical axis aligned with said gunsight optical axis, said optical assembly providing first and second viewing ports for viewing an image produced by said gunsight along first and second perpendicular viewing axes.

5. The device of claim 4 wherein said optical assembly includes a front lens facing said optical gunsight, a beamsplitter for producing first and second images along said perpendicular viewing axes, an aspheric lens for correcting optical distortion in said first and second images, and an eye lens.

6. The device of claim 5 wherein said aspheric lens is positioned between said front lens and said beamsplitter.

7. The device of claim 6 wherein said aspheric lens has one surface which is rotationally symmetric about the X-axis where $$X = CS^2/1 + (1 - C^2S^2)^{\frac{1}{2}} + A_4S^4 + A_6S^6 + A_nS^n$$

where S is the distance from the axis X of the aspheric lens, and $A_4$, $A_6$ and $AN$ are surface deformation coefficients, C is the base sphere curvature.

8. The device of claim 5 wherein said eye lens is cemented to a face of said beamsplitter which produces one of said images.

* * * * *